United States Patent
Virtanen

(10) Patent No.: US 6,347,226 B1
(45) Date of Patent: Feb. 12, 2002

(54) CONTROL OF TRANSCEIVER UNITS IN CELLULAR RADIO SYSTEM

(75) Inventor: Jukka Virtanen, Moisio (FI)

(73) Assignee: Nokia Networks Oy, Espoo (FI)

( * ) Notice: Subject to any disclaimer, the term of this patent is extended or adjusted under 35 U.S.C. 154(b) by 0 days.

(21) Appl. No.: 09/449,850

(22) Filed: Nov. 26, 1999

Related U.S. Application Data

(63) Continuation of application No. PCT/FI98/00443, filed on May 27, 1998.

(30) Foreign Application Priority Data

May 28, 1997 (FI) .................................................. 972263

(51) Int. Cl.⁷ .............................. H04Q 8/30; H04Q 7/20
(52) U.S. Cl. ...................... 455/450; 455/451; 455/453; 455/9
(58) Field of Search ................................. 455/450, 451, 455/452, 453, 454, 509, 510, 511, 8, 9

(56) References Cited

U.S. PATENT DOCUMENTS

| | | | | |
|---|---|---|---|---|
| 5,034,993 A | * | 7/1991 | Sasuta et al. .................. | 455/7 |
| 5,105,420 A | * | 4/1992 | Ardon et al. ................ | 370/216 |
| 5,590,395 A | * | 12/1996 | Diekelman .................. | 455/13.1 |
| 5,697,054 A | * | 12/1997 | Andersson .................... | 455/524 |
| 5,873,038 A | * | 2/1999 | Guimont ...................... | 455/453 |

FOREIGN PATENT DOCUMENTS

| | | |
|---|---|---|
| WO | WO 94/00959 | 1/1994 |
| WO | WO 94/22239 | 9/1994 |
| WO | WO 94/28644 | 12/1994 |

\* cited by examiner

*Primary Examiner*—Daniel Hunter
*Assistant Examiner*—Alan T. Gantt
(74) *Attorney, Agent, or Firm*—Altera Law Group, LLC

(57) ABSTRACT

The invention relates to a cellular radio system comprising a mobile exchange, a first base station communicating with the mobile exchange through a data connection, said base station comprising at least a first transceiver unit for establishing a connection to the mobile stations on one or more channels allocated to it for transmitting telecommunications signals between the mobile stations and the mobile exchange, and control means for controlling the first transceiver unit. In order to save available resources, the control means comprise means for deactivating the first transceiver unit when the traffic capacity need is small in the coverage area of the first base station.

4 Claims, 3 Drawing Sheets

Figure 1:
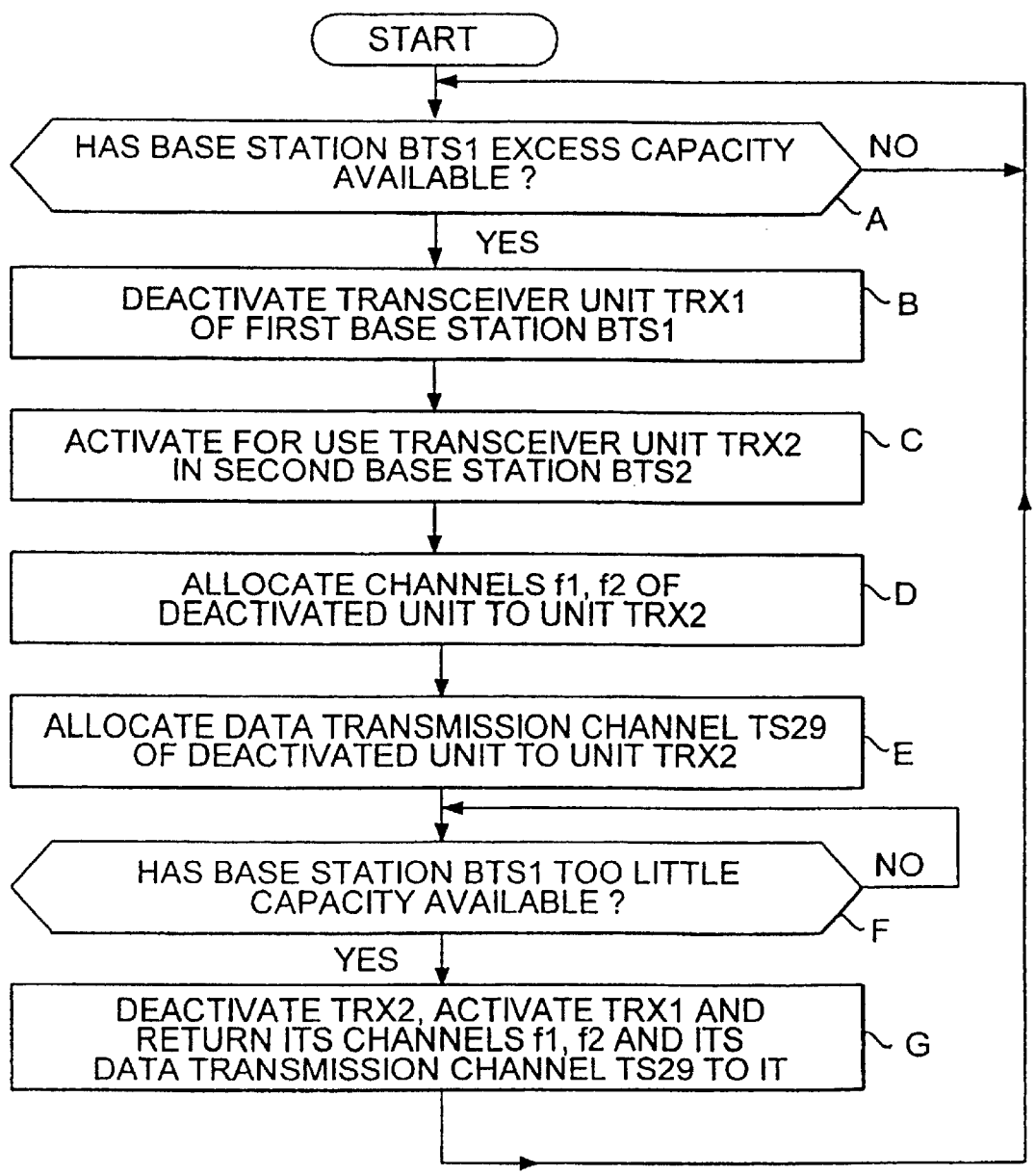

| TSL | SUB TSL 1 | SUB TSL 1 | SUB TSL 1 | SUB TSL 1 |
|---|---|---|---|---|
| 0 | BTS1/TRX1/SIG | BTS1/TRX1/TCH | BTS1/TRX1/TCH | BTS1/TRX1/TCH |
| 1 | BTS1/TRX1/TCH | BTS1/TRX1/TCH | BTS1/TRX1/TCH | BTS1/TRX1/TCH |
| 2 | BTS1/TRX2/SIG | BTS1/TRX2/TCH | BTS1/TRX2/TCH | BTS1/TRX2/TCH |
| 3 | BTS1/TRX2/TCH | BTS1/TRX2/TCH | BTS1/TRX2/TCH | BTS1/TRX2/TCH |
| 4 | BTS1/TRX3/SIG | BTS1/TRX3/TCH | BTS1/TRX3/TCH | BTS1/TRX3/TCH |
| 5 | BTS1/TRX3/TCH | BTS1/TRX3/TCH | BTS1/TRX3/TCH | BTS1/TRX3/TCH |
| 6 | BTS1/TRX4/SIG | BTS1/TRX4/TCH | BTS1/TRX4/TCH | BTS1/TRX4/TCH |
| 7 | BTS1/TRX4/TCH | BTS1/TRX4/TCH | BTS1/TRX4/TCH | BTS1/TRX4/TCH |
| 8 | BTS2/TRX1/SIG | BTS2/TRX1/TCH | BTS2/TRX1/TCH | BTS2/TRX1/TCH |
| 9 | BTS2/TRX1/TCH | BTS2/TRX1/TCH | BTS2/TRX1/TCH | BTS2/TRX1/TCH |
| 10 | BTS2/TRX2/SIG | BTS2/TRX2/TCH | BTS2/TRX2/TCH | BTS2/TRX2/TCH |
| 11 | BTS2/TRX2/TCH | BTS2/TRX2/TCH | BTS2/TRX2/TCH | BTS2/TRX2/TCH |
| 12 | BTS3/TRX1/SIG | BTS3/TRX1/TCH | BTS3/TRX1/TCH | BTS3/TRX1/TCH |
| 13 | BTS3/TRX1/TCH | BTS3/TRX1/TCH | BTS3/TRX1/TCH | BTS3/TRX1/TCH |
| 14 | BTS3/TRX2/SIG | BTS3/TRX2/TCH | BTS3/TRX2/TCH | BTS3/TRX2/TCH |
| 15 | BTS3/TRX2/TCH | BTS3/TRX2/TCH | BTS3/TRX2/TCH | BTS3/TRX2/TCH |
| 16 | BTS4/TRX1/SIG | BTS4/TRX1/TCH | BTS4/TRX1/TCH | BTS4/TRX1/TCH |
| 17 | BTS4/TRX1/TCH | BTS4/TRX1/TCH | BTS4/TRX1/TCH | BTS4/TRX1/TCH |
| 18 | BTS4/TRX2/SIG | BTS4/TRX2/TCH | BTS4/TRX2/TCH | BTS4/TRX2/TCH |
| 19 | BTS4/TRX2/TCH | BTS4/TRX2/TCH | BTS4/TRX2/TCH | BTS4/TRX2/TCH |
| 20 | BTS4/TRX3/SIG | BTS4/TRX3/TCH | BTS4/TRX3/TCH | BTS4/TRX3/TCH |
| 21 | BTS4/TRX3/TCH | BTS4/TRX3/TCH | BTS4/TRX3/TCH | BTS4/TRX3/TCH |
| 22 | BTS4/TRX4/SIG | BTS4/TRX4/TCH | BTS4/TRX4/TCH | BTS4/TRX4/TCH |
| 23 | BTS4/TRX4/TCH | BTS4/TRX4/TCH | BTS4/TRX4/TCH | BTS4/TRX4/TCH |
| 24 | BTS4/TRX5/SIG | BTS4/TRX5/TCH | BTS4/TRX5/TCH | BTS4/TRX5/TCH |
| 25 | BTS4/TRX5/TCH | BTS4/TRX5/TCH | BTS4/TRX5/TCH | BTS4/TRX5/TCH |
| 26 | BTS4/TRX6/SIG | BTS4/TRX6/TCH | BTS4/TRX6/TCH | BTS4/TRX6/TCH |
| 27 | BTS4/TRX6/TCH | BTS4/TRX6/TCH | BTS4/TRX6/TCH | BTS4/TRX6/TCH |
| 28 | BTS4/TRX6/TCH | BTS4/TRX6/TCH | BTS4/TRX6/TCH | BTS4/TRX6/TCH |
| 29 | TRX/SIG | TRX/TCH | TRX/TCH | TRX/TCH |
| 30 | TRX/TCH | TRX/TCH | TRX/TCH | TRX/TCH |
| 31 | BCF 1/OMUSIG | BCF 2/OMUSIG | BCF 3/OMUSIG | BCF 4/OMUSIG |

FIG. 3

CONTROL OF TRANSCEIVER UNITS IN CELLULAR RADIO SYSTEM

This application is a continuation of PCT/FI98/00443, filed May 27, 1998.

The present invention relates to a method for controlling transceiver units of base stations in a cellular radio system comprising at least a first base station comprising a first transceiver unit to which one or more channels have been allocated for receiving and transmitting telecommunications signals via a radio path to the mobile stations located in its radio coverage area. The invention further relates to a cellular radio system comprising a mobile exchange, a first base station communicating with the mobile exchange through a data connection and comprising at least a first transceiver unit for establishing a connection via a radio path to mobile stations located in its coverage area on one or more channels allocated to the first transceiver unit for transmitting telecommunications signals between the mobile stations and the mobile exchange, and control means for controlling the first transceiver unit.

The present invention relates to the dimensioning and management of traffic capacity in a cellular radio system, and particularly to the variations in the capacity need of the different parts in the geographical area covered by the system. In business centres, for example, the traffic capacity need is considerably greater in the daytime than in the evenings. Similarly, in suburban areas, for example, not much capacity is needed in the daytime, but in the evenings the capacity need grows as people return home from work. If, under these circumstances, the cellular radio capacity is dimensioned in accordance with the maximum capacity need, a considerable part of the system capacity will be unused for the most part of the day. Among other things, this means waste of energy since most of the system transceivers use energy continuously, even though no calls are transmitted through them. Furthermore, a data channel to the mobile exchange of the system must usually be continuously allocated to the transceivers which are not used, independently of whether telecommunications signals are being transmitted on the channel at a particular time or not. A considerable part of the existing data transmission capacity is thus unused for the most part of the day.

In prior art solutions, attempts have been made to transmit calls of an adjacent (congested) radio cell via an antenna directed thereto from the neighbouring cell at peak times. An increase in the capacity of the congested cell to manage momentary load peaks can thus be avoided. The disadvantage of this prior art solution is, however, that the antenna which can be directed often fails to give as extensive a coverage area as the base station antenna of the cell.

There are also sectored prior art base stations where a separate additional channel unit is employed by means of relay-type connections, in other words the capacity of the additional channel unit is transferred from one sector to another in such a manner that its antenna output junction is changed by means of the relay connections. However, the geographical area where capacity variations can be implemented is extremely small, since the RF signal obtained from the antenna output of the additional channel unit can only be transmitted rather a short distance in a cable, for example, without a considerable attenuation of the signal in the cable. In practice, the alternative transmission antennas to which the additional channel unit can be connected thus have to be located extremely near each other.

An object of the present invention is to solve the above problems and provide a solution which saves resources and by means of which the transceiver units in a cellular radio system can be controlled in such a manner that the system can manage the load peaks as advantageously as possible. This object is achieved with the method of the invention, which is characterized in that said first transceiver unit is controlled on the basis of the traffic capacity need of the base station in such a manner that the first transceiver unit is deactivated when the traffic capacity need is small in the coverage area of the first base station.

The invention further relates to a cellular radio system to which the method of the invention can be applied. The cellular radio system of the invention is characterized in that the control means comprise means for deactivating the first transceiver unit when the traffic capacity need is small in the coverage area of the first base station.

The invention is based on the idea that by deactivating the excess transceiver units of a particular base station when the traffic capacity need has been reduced in the radio coverage area of the above base station, unnecessary waste of energy and resources can be avoided. The most essential advantages of the invention are thus reductions in energy waste, more economical use of transceiver units and the possibility to utilize available resources, such as data transmission connections between the base station and the other parts of the network, as efficiently as possible.

In a preferred embodiment of the cellular radio system of the invention, transceiver units are controlled in accordance with timing means. In other words, an operator can program the timing means in advance, on the basis of statistics about a particular radio cell (showing the traffic capacity used at different times of the day), for instance, in such a manner that excess transceiver units are deactivated, i.e. switched off, from a base station when the capacity need of the cell is small according to the statistics (at night or at weekends).

In another preferred embodiment of the cellular radio system of the invention, the control means control the amount of the traffic capacity of a base station in traffic use to its total capacity available. This can be performed in such a manner that, for example, a base station controller computes the ratio of the number of the traffic connections in use and available traffic channels and compares the ratio with the reference value that has been predefined by the operator. if the base station controller detects that the reference value is not exceeded, in other words most of the traffic capacity of the base station is unused, it deactivates one or more transceiver units from the base station. The present embodiment of the invention enables the activation/deactivation of the transceiver units to be based on a real traffic situation and not only on a traffic situation based on statistics.

In a third preferred embodiment of the cellular radio system of the invention the system comprises a second base station comprising a spare transceiver unit. The control means can thus activate the spare unit in the above second base station to use the channel(s) of the transceiver unit deactivated from the first base station when the transceiver unit in the first base station has been deactivated. The present embodiment of the invention enables available channels, in other words primarily frequency channels, to be used as efficiently as possible, since a released frequency channel can be re-allocated to the second base station. Traffic capacity can thus also be transferred from the first base station to the second base station when it is needed therein, without it being restricted by the number of available channels in the system, for example. Furthermore, the spare unit in the second base station can operate as a spare unit which is activated in the case of malfunction in a regular transceiver unit of the second base station. Instead of re-allocating an entire frequency channel, it is possible to allocate to the second base station only some of the time slots of a particular frequency channel, whereby the first and the second transceiver units can use different time slots of the same frequency channel.

In a fourth preferred embodiment of the cellular radio system of the invention the data channel (a PCM time slot, for example) that has been used by the deactivated transceiver unit of the first base station is re-allocated to the transceiver unit activated in the second base station. The existing data transmission capacity can thus be utilized as efficiently as possible.

The preferred embodiments of the method and cellular radio system of the invention are disclosed in the attached dependent claims 2 to 5 and 7 to 11.

Figure 2:
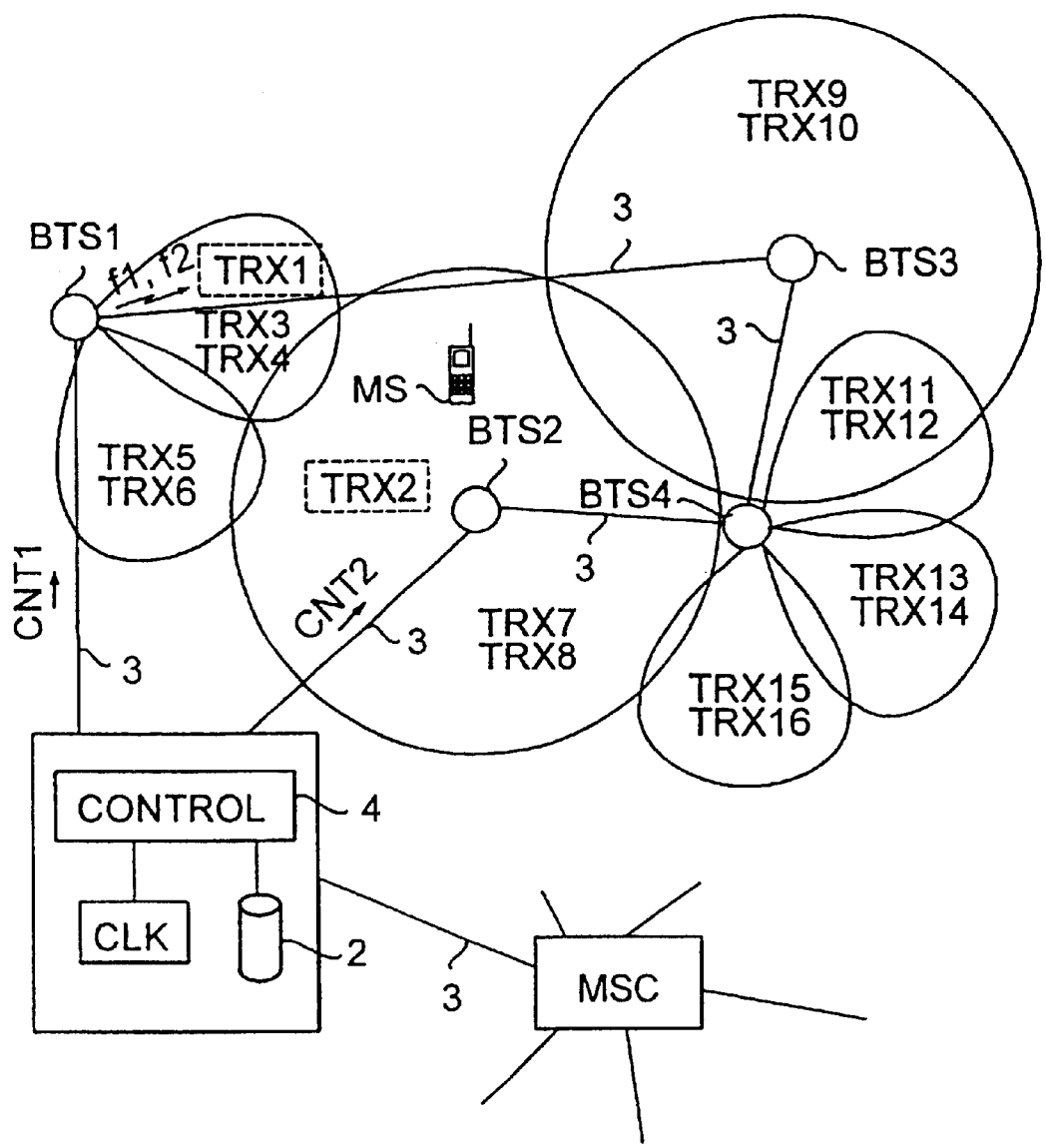

The invention will be described in the following by way of example with reference to the accompanying figures, in which FIG. 1 shows a flow diagram of a first preferred embodiment of the method of the invention, FIG. 2 shows a block diagram 6f a first preferred embodiment of the cellular radio system of the invention, and FIG. 3 illustrates the distribution of time slots between the base stations of a PCM connection.

FIG. 1 shows a flow diagram of a first preferred embodiment of the method of the invention. The flow diagram of FIG. 1 can be applied, for example, in the base station controller of the GSM (Global System for Mobile communications) cellular radio system to control the transceiver units of the base stations.

In block A of FIG. 1 it is checked whether a first base station BTS1 has excess traffic capacity available. This can be performed by computing the ratio of the number of traffic channels in use (a call is in progress) to the number of available (how many calls could be in progress) traffic channels and by comparing the above ratio with a reference value predefined by the operator. Alternatively, a decision can be made by means of a timer, whereby the operator has predefined, on the basis of available statistics, for example, that at a particular time or on a particular day there is usually excess capacity available in the base station in question.

In block B, an excess transceiver unit TRX1 of the first base station is deactivated.

In block C, a spare transceiver unit TRX2 of a second base station BTS2 is activated. It can be, for example, a transceiver unit which is arranged to be a spare unit in the base station BTS2 and which, in the case of malfunction, is connected to replace a regular transceiver unit of the base station BTS2 when the regular transceiver unit is broken. In accordance with the invention, the above spare unit can also be utilized to provide additional capacity for the base station BTS2.

In block D, a channel or channels, in other words frequency channels f1 and f2, for instance, of the transceiver unit TRX1, which has been deactivated in the base station BTS1, are allocated to the spare unit TRX2. The base station BTS2 is thus provided with new frequency channels, which makes it possible to increase its traffic capacity. Since the base stations BTS1 and BTS2, in accordance with the invention, are located at a distance from each other, the capacity of the network can thus be allocated to the geographical area where it is needed.

In block E, a data channel that has been used by the deactivated transceiver unit, in other words a time slot TS29 of the PCM (Pulse Code Modulation) connection leading to a mobile exchange, is allocated to the unit TRX2. Excess data transmission capacity can thus be avoided since the transceiver units TRX1 and TRX2 in different base stations can utilize the same data channel alternately.

In block F it is checked, in a similar manner as in block A, whether the traffic situation of the first base station has changed. In other words, the checking can be based on statistics/a timer or a real measured traffic situation. If, in such a case, it is noted that the traffic situation has changed in such a manner that more capacity is needed in the base station BTS1, a transfer to block G is performed.

In block G, the transceiver unit TRX2 of the second base station BTS2 is deactivated and the transceiver unit TRX1 of the first base station BTS1 is activated. The channels f1 and f2 and the time slot TS29 of the PCM connection leading to the mobile exchange, which were originally (in other words in block A) allocated to the transceiver unit TRX1, are returned to it.

FIG. 2 shows a block diagram of a first preferred embodiment of the cellular radio system of the invention. The cellular radio system of FIG. 2 can be a GSM system, for example.

FIG. 2 shows four base stations BTS1 to BTS4, of which the base stations BTS1 and BTS4 are sectored, whereby they have in their use two transceiver units TRX3 to TRX6 and TRX11 to TRX16 for each sector, respectively. The base stations BTS2 and BTS3 are not, however, sectored, but they both have two transceiver units TRX7 to TRX10 in their use, by which they serve their entire coverage area. In addition to the above transceivers, additional transceiver units TRX1 and TRX2 have been arranged to base station BTS1 (sector 1) and base station BTS2 respectively.

The base stations of FIG. 2 are arranged in a chain, in other words the data connection 3 between them and a mobile exchange MSC passes from a base station to another in such a manner that the base station BTS1, for example, repeats the signals supplied by the base station BTS3 to a base station controller BSC, which forwards them to the mobile exchange MSC. This data connection can be, in the case of FIG. 2, a PCM connection established by means of cables 3. From the connection a particular number of time slots has been allocated to each base station for transmitting the traffic signals of the transceivers and at least one time slot for the signalling between the base station and the base station controller.

In the case of FIG. 2 the base station controller BSC comprises a timer CLK and a database 2 in which the operator has stored data in advance (on the basis of statistics) on the periods of time when the cell 1 of the base station BTS1 is congested and when the traffic is slow. In accordance with the invention the control unit 4 of the base station controller utilizes the above data for deactivating the transceiver unit TRX1 of the base station BTS1 at the times indicated by the timer CLK. In other words, when traffic is light on the basis of the statistics 2 of the database 2, the control unit 4, which can be formed by part of the radio network management process in the system, sends a first control message CNT1 to the base station BTS1. The base station BTS1 comprises means for deactivating the transceiver unit TRX1 by turning out the current, for example, in response to a first control signal CNT1. In such a case the base station BTS1 stops utilizing the frequency channels f1 and f2 which were used by the transceiver unit BTS1.

After sending the first control message the base station controller sends a second control message CNT2 to the base station BTS2. The base station BTS2 comprises means for activating the spare unit TRX2 therein in response to the second control message. One or more channels, for example the frequency channels f1 and f2, which have been used by the deactivated unit TRX1 are then allocated to the spare unit TRX2. Similarly, a PCM time slot, for example a time slot TS29, which has been used by the deactivated unit TRX1 is allocated to the spare unit. The excess capacity of the base station BTS1 has thus been transferred to the neighbouring base station BTS2 in which it can be utilized until the base station BTS1 needs the transferred channels again.

The base stations BTS1 and BTS2, between which the channels are transferred, are advantageously chosen in such a manner that they are located at a distance from each other, in addition to which their peak load times should differ from each other. In other words, the base station BTS1 can be located in the centre of a city, for example, where the capacity need is small in the evenings, and the base station BTS2 in an area where there are many houses and a great capacity need in the evenings.

Account should be taken of the transferring channels already when the network is being designed (a frequency reutilization plan) in such a manner that the frequencies to be transferred are not being used by the neighbouring base station of either base station BTS1 or BTS2, whereby interference can be avoided.

As distinct from the case of FIG. 2, the base station controller can be equipped with means by which it continuously measures the real traffic load of the base stations. The control (activation/deactivation) of the additional channel units of the base stations can thus be implemented in accordance with the real traffic load, not only on the basis of statistics.

FIG. 3 illustrates the distribution of the time slots of a PCM connection between the base stations. The distribution of the table of FIG. 3 can be utilized, for example, in a cellular radio system which uses four base stations connected in a chain, and of which
a first has four transceiver units and a spare unit,
a second has two transceiver units and a spare unit,
a third has two transceiver units and a spare unit, and
a fourth has six transceiver units and a spare unit.

The PCM time slots 29–30 of FIG. 3 are time slots allocated to the speech channels/signalling of the spare units. These time slots are allocated to the base station whose spare unit is put to use. No separate time slots from the PCM connection need thus be allocated to the spare units, but the existing data transmission capacity, in other words the time slots of the PCM connection, can be utilized as efficiently as possible.

It is to be understood that the above description and the accompanying figures are only intended to illustrate the present invention. It will be obvious to those skilled in the art that the invention can be varied and modified in many ways without departing from the scope and spirit of the invention disclosed in the attached claims.

What is claimed is:

1. A method for controlling transceiver units of base stations in a cellular radio system comprising at least a first base station comprising:
a first transceiver unit to which one or more radio channels have been allocated for receiving and transmitting telecommunications signals via a radio path to mobile stations located in its radio coverage area and to which a data channel has been allocated for communicating with a mobile exchange, and
a second base station which is located at a distance from the first base station and which comprises at least a second transceiver unit, said method comprising:
compiling statistics on the capacity need of the first base station at different times of the day and/or on different days of the week in the coverage area of the first base station; and
controlling said first transceiver unit on the basis of the traffic capacity need of the first base station in such a manner that the first transceiver unit is deactivated and activated respectively at predetermined times of the day and/or on predetermined days of the week on the basis of said statistics, the deactivation comprising:
sending a first control message to the first base station, said first base station comprising means for deactivating the first transceiver unit in response to the control message;
sending a second control message to the second base station, said second base station comprising means for activating the second transceiver unit in response to said control message; and
allocating one or more radio channels and said data channel for communication with a mobile exchange which have been used by the first deactivated transceiver unit to the second activated transceiver unit located in the second base station.

2. A method as claimed in claim 1, wherein said data channel is a PCM connection, and the same PCM time slot which has been used by the first deactivated transceiver unit is allocated to the second activated transceiver unit.

3. A cellular radio system comprising:
a mobile exchange;
a first base station communicating with the mobile exchange through a data channel, said base station comprising at least a first transceiver unit for establishing a connection via a radio path to mobile stations located in its coverage area on one or more radio channels allocated to the first transceiver unit for transmitting telecommunications signals between the mobile stations and the mobile exchange;
a second base station located at a distance from the first base station and comprising means for establishing a connection to mobile stations in its coverage area for transmitting telecommunications signals between the mobile stations and the mobile exchange; and
control means; wherein:
said control means comprises timing means and means for deactivating the first transceiver unit at a particular time of the day and/or on a particular day indicated by the timing means, when the traffic capacity need is small in the coverage area of the first base station; and
said control means further comprises means for activating a second transceiver unit located in the second base station to use one or more of said radio channels and said data channel which have been used by the first deactivated transceiver unit of the first base station when the first transceiver unit is deactivated.

4. A cellular radio system as claimed in claim 3, wherein said data channel is a PCM connection, and the first and the second transceiver units are arranged to utilize the same PCM time slot.

* * * * *